United States Patent [19]

Hunt

[11] 4,057,528

[45] Nov. 8, 1977

[54] PROCESS FOR REPAIRING CONCRETE STRUCTURES USING PNEUMATICALLY SPRAYABLE CEMENT MORTAR COMPOSITIONS CONTAINING PORTLAND CEMENT, MINERAL AGGREGATE, A STYRENE-BUTADIENE COPOLYMER LATEX AND WATER

[75] Inventor: David A. Hunt, Midland, Mich.

[73] Assignee: The Dow Chemical Company, Midland, Mich.

[21] Appl. No.: 678,280

[22] Filed: Apr. 19, 1976

[51] Int. Cl.$^2$ .............................................. C08L 9/10
[52] U.S. Cl. ........................ 260/29.7 S; 260/29.7 SQ; 260/29.7 SE
[58] Field of Search .................. 260/29.7 S, 29.7 SQ, 260/29.7 SE, 29.6 S

[56] References Cited

U.S. PATENT DOCUMENTS

| Re. 28,722 | 2/1976 | Sanders | 260/29.7 S |
| 3,043,790 | 7/1962 | Sanders | 260/29.7 S |
| 3,895,953 | 7/1975 | Mekta | 106/88 |

Primary Examiner—M. J. Welsh
Attorney, Agent, or Firm—Ronald G. Brookens

[57] ABSTRACT

Process for repairing concrete compositions using cement mortar compositions which are capable of being pneumatically sprayed and which provide unexpectedly enhanced bonding capabilities and resistance to slump; said compositions comprising essentially a substantially non-air entraining portland cement, mineral aggregate, a styrene-butadiene copolymer latex present on a solids basis in an amount of from about 5 to about 25 percent by weight of cement, and water in an amount sufficient to provide a total water to cement ratio of from 0.22 to 0.26.

8 Claims, 1 Drawing Figure

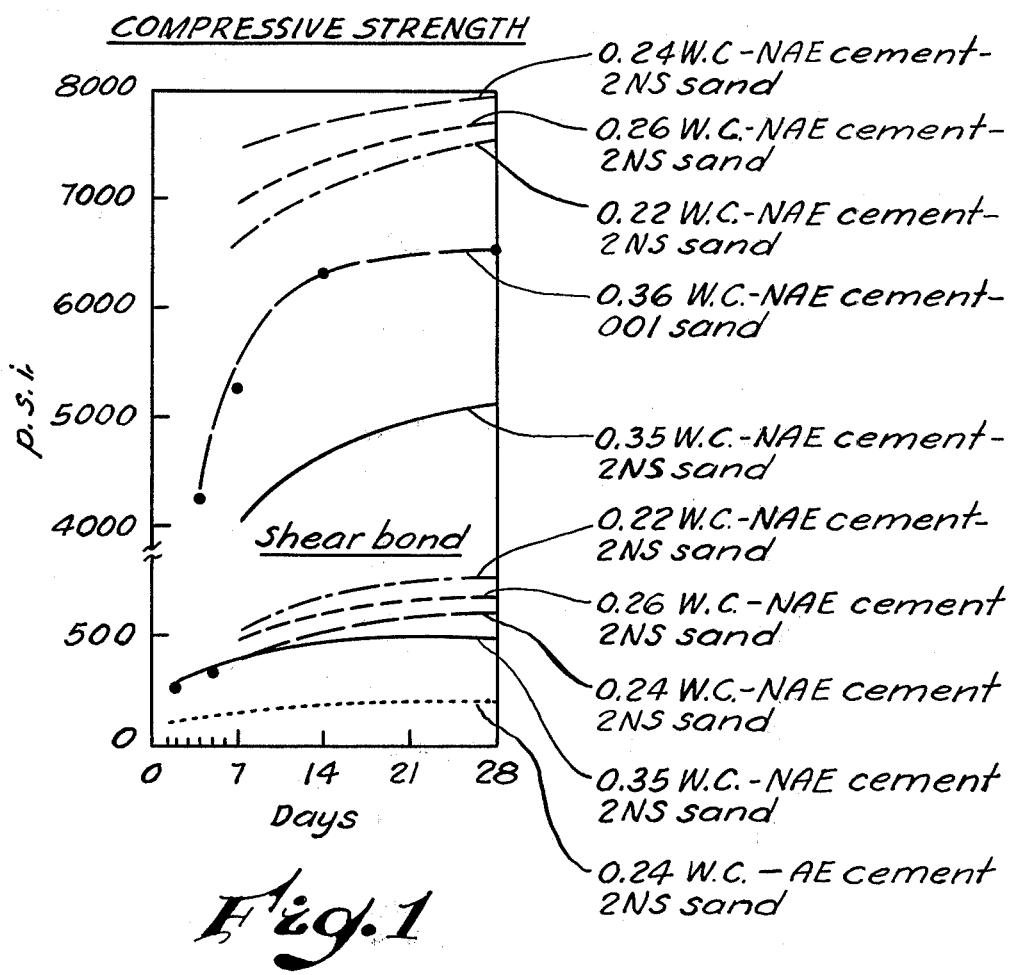

PROCESS FOR REPAIRING CONCRETE STRUCTURES USING PNEUMATICALLY SPRAYABLE CEMENT MORTAR COMPOSITIONS CONTAINING PORTLAND CEMENT, MINERAL AGGREGATE, A STYRENE-BUTADIENE COPOLYMER LATEX AND WATER

BACKGROUND OF THE INVENTION

The use of styrene-butadiene copolymer latex in portland cement compositions is known to improve the properties of such compositions. For example, U.S. Pat. No. 3,043,790 discloses that the addition to portland cement compositions of styrene-butadiene copolymer latexes of the type contemplated by the present invention, results in improved strength, especially when cured under adverse curing conditions, as well as enhanced flexibility, adhesion, and elongation at break. These latex modified portland cement compositions have found wide acceptance in the preparation and repair of highway and bridge deck construction.

Further, U.S. Pat. No. 3,895,953 discloses mixtures of hydraulic cement, sand, gravel, water and small amounts of a styrene-butadiene copolymer latex wherein such latex is utilized to reduce early slump loss of the mixtures, e.g. during transportation and handling of such mixtures.

The placing of concrete on vertical and/or overhead surfaces, e.g. concrete columns, piers, beams, soffits and bridge deck undersides, is also known in the art. Such applications require cement compositions which can be efficiently sprayed, e.g. by pneumatic means, onto the surfaces to be repaired or constructed. This process is known in the industry as "shotcreting" and "guniting". Special problems are encountered in utilization of cement compositions in such applications. More specifically, the use of prior known polymer latex modified cement compositions fail to provide a combination of adequate sprayablilty and required adhesion to the surface being coated while providing sufficient resistance to volume change.

It is the primary object of the present invention to provide cement compositions which can be effectively pneumatically sprayed onto surfaces to be repaired or constructed and which provide excellent bonding and resistance to volume change.

SUMMARY

The above and related objects are achieved by use of cement mortar compositions comprising essentially a substantially non-air entraining portland cement, mineral aggregate, a styrene-butadiene copolymer latex present on a solids basis in an amount of from about 5 to about 25 percent by weight of cement, and water in an amount sufficient to provide a total water to cement ratio of from 0.22 to 0.26.

The cement employed in the practice of the present invention may be any substantially non-air entraining cement. Particularly preferred are those substantially non-air entraining materials conforming to the requriements of ASTM TEST NO. C-150 for Type I cement.

The aggregate employed in admixture with such cement may be any conventionally used material inclusive of the limestones and silica aggregate materials. Particularly preferred, however, are those materials conforming to the requirements of ASTM TEST NO. C-33 for concrete sand. Preferred weight ratios of cement to aggregate are from about 1 to about 3 when the specific gravity of the aggregate is 2.65.

Preferred styrene-butadiene copolymer latexes employed in the present invention are aqueous dispersions of a copolymer of styrene and butadiene having a styrene:butadiene weight ratio of from about 30:70 to about 70:30. Especially preferred are those materials containing, based on the weight of the styrene-butadiene copolymer, (a) from about 2 to about 10 percent of non-ionic surfactant, (b) from about 0.75 to 7.5 percent of anionic surfactant, at least about 15 percent of which is a sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of the copolymer and the weight ratio of (a) to (b) being within the range of about 0.7:1 to 10:1.

Some or all of the non-ionic and anionic surfactants employed can be present while effecting copolymerization of the styrene and butadiene. Ordinarily, however, it is preferred to follow the practices used in making styrene-butadiene emulsions for use in preparing latex paints. Thus, some but not necessarily all of the anionic surfactant is introduced to aid in effecting the desired dispersion and emulsification in carrying out the copolymerization of butadiene and styrene, and the non-ionic surfactant is subsequently added to stabilize the resulting polymer dispersion. The polyorganosiloxane foam depressant and such additional quantities of non-ionic surfactant and anionic surfactant, as are required to complete the cement composition, are subsequently introduced.

Illustrative of non-ionic surfactants are, for example: fatty acid esters such as glycerol monostearate, diethyleneglycol laurate, propyleneglycol monostearate, sorbitol monolaurate, and pentaerythritol monostearate, acid derivatives of ethylene oxide products such as the reaction product of six moles of ethylene oxide with one of oleic acid; condensation products of ethylene oxide with alcohols such as stearyl alcohol; and condensation products of ethylene oxide with phenols, naphthols, and alkyl phenols such as di-t-butylphenoxynonaoxyethylene-ethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. As pointed out heretofore, at least 15 percent of the anionic surfactant component of the cement additive of the invention should be a sodium higher alkyl sulfate such as sodium lauryl sulfate and preferably the anionic surfactant component consists of a mixture of an alkyl aryl sulfonate surfactant and such sodium alkyl sulfate.

Illustrative of the polyorganosiloxanes are the condensation products resulting from polymerization of organo silane diols, as represented by the formula

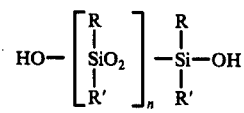

where R and R', in the above formula, represent organic radicals such as alkyl, aryl, aralkyl and alkaryl or heterocyclic groups, and $n$ is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

Particularly preferred latexes are those wherein the copolymer comprises about 48 percent by weight of the total emulsion; wherein such copolymer contains about 66 percent by weight styrene and about 34 percent by weight butadiene, where the copolymer particles have an average size of from about 1900 to about 2500 Angstroms, and wherein the polymeric latex has a pH of from about 9.5 to 11.

The sprayable cement mortar compositions of the present invention are prepared by combining the ingredients in any conventional mixing chamber. The admixture can then be pushed by compressed air through a hose and sprayed onto the surfaces to be covered or repaired.

By way of further illustration, a sprayable cement mortar composition was prepared by admixture, of the following ingredients in a commercial shotcrete mixer:

A. 282 pounds silica concrete sand conforming to ASTM C-33, measured on a dry weight basis and having a specific gravity of 2.65;

B. 94 pounds portland cement, type I, non-air-entraining;

C. 3½ gallons (29.4 pounds) of a styrene-butadiene latex having a pH of about 10 and composed essentially of about 48 weight percent of a solid copolymer of about 66 percent by weight styrene and about 34 percent by weight butadiene-1,3 with the copolymer particles having an average size of from about 1900 to about 2500 Angstroms; and based on the copolymer weight, about 4.65 percent of the non-ionic surfactant di-t-butyl-phenoxynonaoxyethylene-ethanol; and about 0.78 percent of a mixture of anionic surfactants comprising predominant amounts of sodium lauryl sulfate and correspondingly lesser amounts of dodecyl benzene sodium sulfonate, and a polymethylsiloxane foam depressant in an amount to provide about 0.4 percent by weight of polymethysiloxane based on the weight of latex solids; and D. Sufficient water to provide a total water to cement ratio of from 0.22 to 0.26.

In the preparation of the above admixture, the sand was dried to the lowest possible uniform moisture content to permit optimum quality control over the water to cement ratio. To further aid such quality control, 5 pounds of portland cement and 2 gallons of water were poured into the shotcrete mixer to prewet the interior surfaces of such mixer. Excess prewetting slurry of the portland cement and water was pneumatically pushed through the hose at low air pressure. This step prevents plugging of the hose when the cement mortar composition is subsequently sprayed therefrom.

The specified ingredients were added to the shotcrete mixer in the following sequence. The copolymer latex was poured into the mixer followed by addition of one half of the sand followed by all of the portland cement. The remainder of the sand was added and additional water introduced to bring the water-cement ratio to the required level. The materials were mixed for a period of about 3½ minutes.

The above compositions were then tested for bonding capabilities and compressive strength properties. Bonding capability was measured as shear bond strength determined by forming a portion of such compositions into a slab 1½ inches by 15 inches by 35 inches. The slabs were cured at 75° F and 100% relative humidity for a period of 28 days. After curing, one large surface area was sand blasted to remove the weak layer of air dried cement on the slab surface. The sand blasted surface was then dampened with water for 30 minutes just prior to spraying such surface with a 1½ inch thick layer of latex modified cement mortar. The latex modified portland cement mortar was allowed to cure one day under 100% relative humidity and the remaining 27 days at 50 percent relative humidity and a temperature of 73° F. The slabs were sawed into 3 inch by 4 inch prisms for testing. To determine shear bond strength, the prism was inserted into a heavy steel frame which was securely fastened to the base of the testing machine. The latex modified cement mortar cap was allowed to extend out beyond the edge of the metal frame with the bond interface aligned to the shear plane of the frame. A constantly increasing force was applied to the mortar cap by a steel ram and yoke that conformed to the top surface and extended down each of two ends. The shear bond strength was determined by the following formula:

$E_s' = F/A$ $E_s'$ = Shear bond strength (psi)
F = Force (pounds)
A = Cross sectional area of the cylinder Compressive strength of cylinders molded at the same time as the slabs was also obtained by procedures set forth in ASTM TEST NO. C-192.

FIG. 1 illustrates the compressive strengths and shear bond strengths observed for the sprayable cement mortar compositions disclosed herein. Note that in FIG. 1 the designation "W.C." means water to cement ratio; the designation "NAE" means non-air entraining; and the designation "AE" means air entraining. Also note that FIG. 1 sets forth comparative data illustrating the criticality of utilizing a water to cement "W.C." ratio of from 0.22 to 0.26 and a non-air entraining "NAE" cement.

In additional experiments, the latex modified cement mortar compositions prescribed herein as being representative of the present invention, where utilized in conventional shotcrete apparatus for repair of concrete surfaces. Preparation of the surface to be repaired included removal of deteriorated concrete by hand chipping, sand blasting the sound concrete and reinforcing steel, and a final prewetting of the sandblasted surface for a period of about 30 minutes. The latex modified cement mortar composition was then pneumatically pushed through a nozzle and applied to the surface to be repaired in individual layers of not more than about one inch in thickness. Each layer was allowed time to firm itself prior to subsequent layer build up. The resulting surface was permitted to cure for a period of at least about 4 hours before the application of water spray or waterproof paints and/or curing compounds. Utilization of the prescribed latex modified cement mortar compositions having a water to cement ratio of from 0.22 to 0.26 were easily sprayed without plugging of the hose or nozzle and formed strongly bonded coatings with excellent resistance to volume change. More specifically, the use of the prescribed low water-cement ratios and non-air entrained portland cement eliminated the tendency of coatings formed therefrom to sag or fall from the surface being coated. Further, use of the prescribed compositions permit an air dry curing without resultant shrinkage cracking, which result is not obtainable using compositions having higher water-cement ratios. The use of a dry cure is important to allow for evaporation of water from the coating, which in turn, provides significantly enhanced bonding capabilities. It is also important to note that for obtainment of optimum results, the sprayable cement mortar compositions of the present invention should not be applied at temperatures below about 45° F. Still further, use of the latex modified cement concrete compositions of the present invention in shotcreting applications eliminates the necessity for using wire mesh reinforcement which is conventionally used to prevent the coating from sagging or falling from the surface being coated. This beneficial result is due to the significantly enhanced bond produced along with resistance to volume change, as compared to the results obtained utilizing compositions having higher water to cement ratios and/or air entraining cements. Because of the advantages described above, the sprayable cement mortar compositions of the present invention are particularly adaptable for shotcrete repair of vertical or overhead concrete surfaces, as for example, repair to bridge deck undersides and pier support surfaces.

What is claimed is:

1. In the process of repairing concrete structures by applying a cement mortar thereto the improvement consisting of pneumatically applying to the concrete structure to be repaired, a mixture of a substantially non-air entraining portland cement, mineral aggregate, a styrene-butadiene copolymer latex having a styrene to butadiene weight ratio of from about 30:70 to about 70:30, said copolymer being present on a solids basis in an amount of from about 5 to about 25 percent by weight of cement, and from about 0.1 to 5 percent of a polyorganosiloxane foam depressant based on the weight of active polyorganosiloxane, while maintaining the ratio of total water to cement in such mixture at a value of from 0.22 to 0.26.

2. The process of claim 1 wherein said polyorganosiloxane is a condensation product of dimethyl silane diol.

3. The process of claim 2 wherein said latex contains, based on the weight of said copolymer, (a) from about 2 to about 10 percent of non-ionic surfactant, (b) from about 0.75 to 7.5 percent of anionic surfactant, at least about 15 percent of which is a sodium alkyl sulfate in which the alkyl group contains 9 to 17 carbon atoms, the sum of (a) and (b) not exceeding about 11 percent by weight of said copolymer and the weight ratio of (a) to (b) being within the range of about 0.7:1 to 10:1.

4. The process of claim 3 wherein said non-ionic surfactant is a di-alkylphenoxynonaoxyethylene-ethanol and the anionic surfactant comprises a mixture of an alkyl aryl sulfonate and a sodium alkyl sulfate.

5. The process of claim 4 wherein said alkyl aryl sulfonate is dodecylbenzene sodium sulfonate and said sodium alkyl sulfate is sodium lauryl sulfate.

6. The process of claim 5 wherein said copolymer is a copolymer of about 66 percent by weight styrene and about 34 percent by weight butadiene.

7. The process of claim 6 wherein said copolymer has an average particle size of from about 1900A to about 2500A.

8. The process of claim 7 wherein said copolymer latex has a pH of from about 9.5 to about 11.

* * * * *